United States Patent [19]
Ganoung

[11] Patent Number: 5,553,580
[45] Date of Patent: Sep. 10, 1996

[54] STRATIFIED CHARGE ENGINES AND METHOD FOR THEIR OPERATION

[76] Inventor: David P. Ganoung, 2800½ Candelaria, NW, Albuquerque, N.M. 87107

[21] Appl. No.: 372,300

[22] Filed: Jan. 13, 1995

[51] Int. Cl.⁶ ..................................................... F02B 23/08
[52] U.S. Cl. ............................................. 123/308; 123/432
[58] Field of Search .................................... 123/308, 432

[56] References Cited

U.S. PATENT DOCUMENTS

| | | | |
|---|---|---|---|
| 4,166,436 | 9/1979 | Yamakawa | 123/307 |
| 4,211,189 | 7/1980 | Hamai | 123/308 |
| 4,543,931 | 10/1985 | Hitomi et al. | 123/308 |
| 4,726,343 | 2/1988 | Kruger | 123/432 |
| 5,203,288 | 4/1993 | Melchior et al. | 123/432 |
| 5,220,899 | 6/1993 | Ikebe et al. | 123/308 |

FOREIGN PATENT DOCUMENTS

| | | | |
|---|---|---|---|
| 0075643 | 4/1983 | European Pat. Off. | 123/432 |
| 0113450 | 7/1984 | European Pat. Off. | 123/308 |
| 2853576 | 7/1979 | Germany | 123/308 |
| 0928048 | 5/1982 | U.S.S.R. | 123/307 |

*Primary Examiner*—David A. Okonsky

[57] ABSTRACT

A preferred combustion chamber configuration for a piston engine includes two intake valves and one exhaust valve. The two identical intake valves and their associated induction system are arranged to promote separation of the two barrel swirl layers as established in the engine cylinder through the two valves. Further included, in a location containing the intake valves, is a large squish area for providing a fast burn rate in spite of spark ignition in just the richer one of the two barrel swirl layers. Such ignition therefore remains reliable and consistent even when no fuel is injected into the intake passage feeding the leaner swirl layer. Also included in the invention is an engine operating strategy which refrains from injecting fuel into the leaner intake passage until a central engine throttle valve is first at least effectively wide open. Drive-by-wire control coordinates the resulting throttled and unthrottled ranges of engine brake torque output.

25 Claims, 5 Drawing Sheets

STRATIFIED CHARGE ENGINES AND METHOD FOR THEIR OPERATION

BACKGROUND OF THE INVENTION

1. Field of the Invention

This invention relates to throttled internal combustion engines which utilize both the four-stroke combustion cycle and stratification of the intake charge. The engine may have either a piston or a rotary configuration, but its strata of varying mixture strength result from establishing distinctly different air-fuel or dilution ratios in the mixture inducted separately through two or more engine intake passages.

This invention also relates to methods for regulating the brake torque output of the foregoing type of stratified charge engine.

2. Description of the Prior Art

Although employing two or more intake valves for each cylinder of a piston engine is a long known way of improving engine breathing, establishing charge stratification in such engines via barrel swirl is a much more recent discovery. U.S. Pat. No. 5,050,557 (Ishida et al.), U.S. Pat. No. 5,273,973 (Oda), U.S. Pat. No. 5,273,974 (Isomoto et al.) and U.S. Pat. No. 5,295,464 (Ando et al.) all disclose barrel-stratified piston engines. At the same time, combustion chambers with three or more poppet valves usually employ the pentroof configuration, which leaves little room conveniently available for turbulence enhancing squish area. As a result, barrel swirl and a central spark plug location must be relied on to such an extent that other disadvantages arise. For example, the bulk flow of a very high barrel swirl ratio can easily blow the ionization path from between a spark plug's electrodes to such a degree that the path is broken. As another example, using a central spark plug location precludes utilizing the particular type of barrel swirl that is most pronounced and most easily maintained during the compression stroke. In the case of the Wankel rotary engine, barrel stratification does have its analogy, but the prior art makes no mention of this new type of stratification in rotary engines.

Of the prior art just mentioned, only Oda '973 considers employing variable stratification in combination with the engine throttle valve in an overall scheme for regulating engine brake torque output. Using throttling exclusively at lower brake mean effective pressure (BMEP), and variable stratification exclusively at higher BMEP, produces the maximum efficiency gain, but the prior art discloses a blended rather than a segregated combination of these two types of BMEP regulation.

SUMMARY OF THE INVENTION

In view of the above considerations, it is therefore an object of the present invention to improve upon reciprocating piston engines which utilize barrel stratification to reduce brake specific fuel consumption.

It is also an object of the invention to extend the technique of barrel stratification to rotary four-stroke engines such as the Wankel engine.

It is another object of the present invention to present an advantageous strategy for operating engines which employ barrel stratification, including Wankel engines.

It is still another object of the invention to make available for internal combustion engines a three-valve, barrel-stratified combustion chamber with ample valve sizes and a fast burn rate achieved primarily through a large squish area.

It is yet another object to present for barrel-stratified engines an operating strategy which reduces cold-start exhaust emissions of unburned fuel.

These and other objects, features and advantages will become apparent to those skilled in the art from the following detailed description when read in conjunction with the accompanying drawing and the appended claims.

In accordance with the present invention in a broad aspect, a high squish area barrel-stratified combustion chamber is presented. In addition to a squish area which completely includes the faces of each of the at least two intake valves per cylinder, but no part of the faces of any exhaust valves, fuel metering means and tumble ports for establishing barrel stratification are also included in the present invention. For instance, only air may be inducted through one of two identical intake valves per cylinder while a fuel injector meters gasoline in stoichiometric proportion to the air admitted past the other intake valve; at least one spark plug resides in the rich mixture zone of each cylinder. Especially compatible with these engine features are a flat-topped piston and a single-overhead-cam arrangement with the stems of all valves positioned in parallel.

As the other main aspect of the present invention, inducting only air past one of two identical intake valves per engine cylinder causes fuel to be absent from half of the stoichiometric mixture filling each cylinder. As a result, this regime of throttled engine operation extends up to only the general area of half of maximum engine brake mean effective pressure (BMEP). The remaining broad range of higher BMEP, and thus of higher engine brake torque output, is obtained without significant throttling by regulating the amount of fuel metered by an auxiliary fuel injector into air admitted past the previously "air-only" intake valve of each engine cylinder.

BRIEF DESCRIPTION OF THE DRAWING

The present invention is illustrated in the accompanying drawing, in which.

DESCRIPTION OF THE PREFERRED EMBODIMENT

Figure 1:
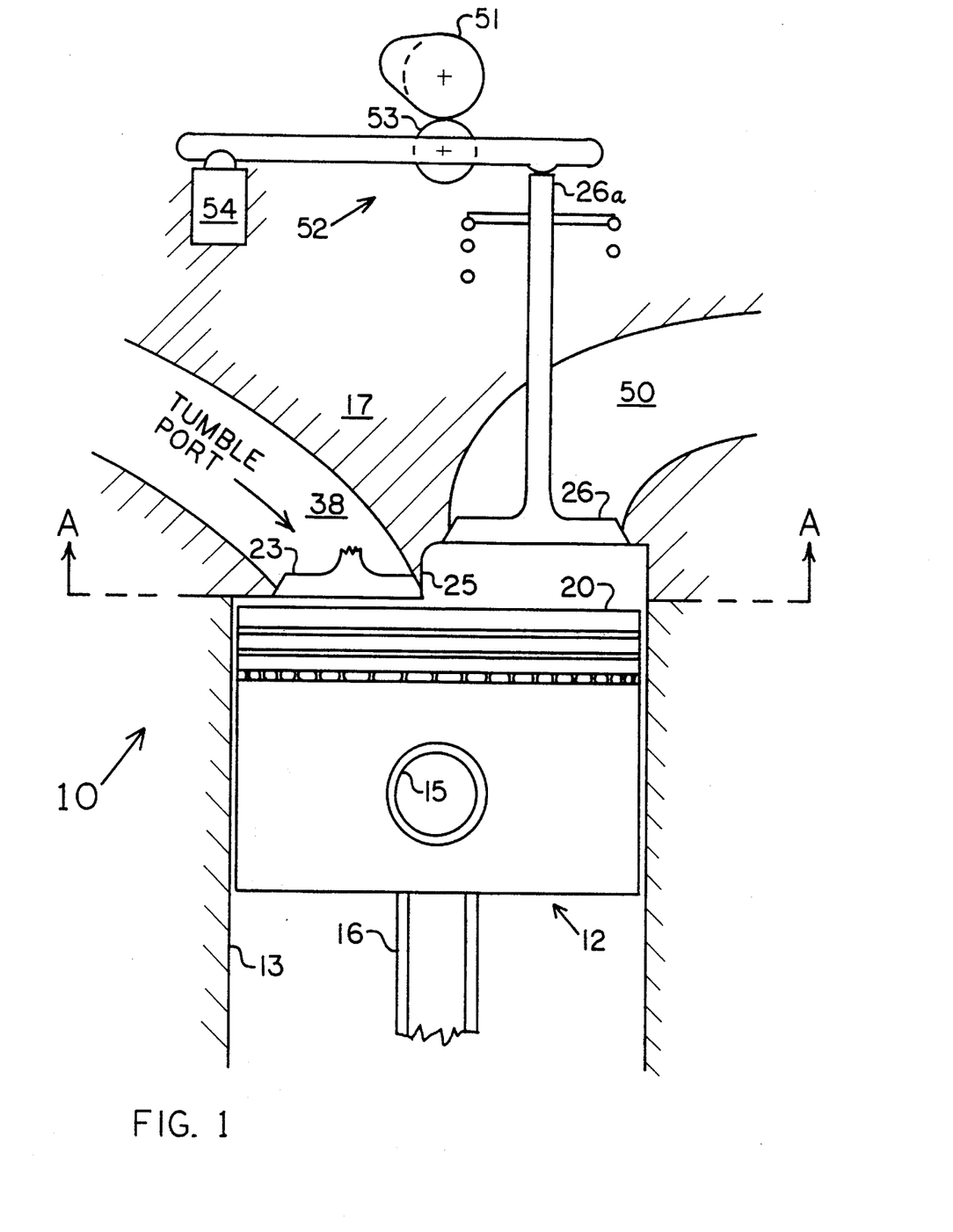
FIG. 1 is a staggered cross-sectional representation of one cylinder of a reciprocating engine according to a preferred embodiment of the present invention.
Figure 2:
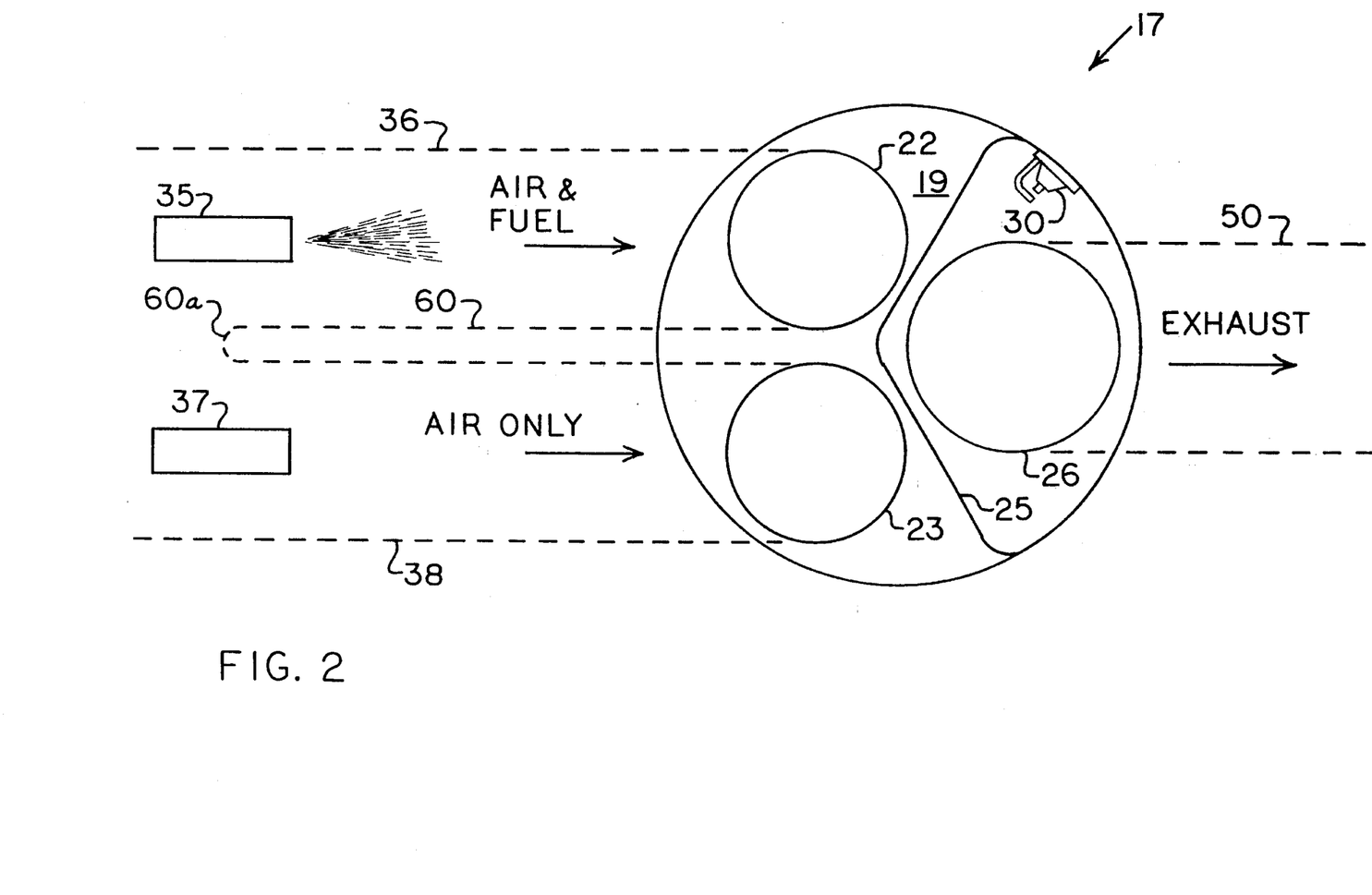
FIG. 2 is cross-sectional view A—A of the valve faces and other cylinder head features of the cylinder of FIG. 1.

The present invention includes a novel stratified-charge, spark-ignition engine of the four-stroke type, and it also includes an advantageous way of operating this new engine as well as certain known stratified-charge engines. FIG. 1 and FIG. 2 together reveal novel aspects of the engine itself, and the method of operation is illustrated mainly in FIG. 3 and FIG. 4.

Beginning then with FIG. 1, a staggered sectional view shows how a one-cylinder portion 10 of an engine designed according to the present invention would incorporate essential structural features. Nevertheless, the piston assembly 12 fitted within the actual bore 13 of this one cylinder 10 may be completely conventional, as may apparatus for reciprocating the three-ring piston 12 within the bore 13. In more detail, the piston wrist pin 15 attaches the piston 12 to the connecting rod 16, and the rod 16 in turn attaches directly to the engine crankshaft, which is not explicitly shown because this type of slider-crank mechanism has achieved such widespread usage in internal combustion engines.

The head portion 17 of the cylinder 10, in contrast, exhibits novel features, most notably, a three-valve combustion chamber layout with an extensive squish area 19. FIG. 1 and FIG. 2 best illustrate these novel features when viewed together, and FIG. 2 makes it clear that FIG. 1 is a staggered section only with respect to the popper valves serving the one-cylinder portion 10, and not with respect to other valvetrain apparatus or the piston 12. FIG. 1 does suggest, by showing the piston 12 in its top-dead-center position, the fact that the flat crown or top portion 20 of the piston 12 comes within roughly thirty or forty thousandths of an inch of the face of each of the two closed intake valves 27 and 23 as well as within approximately the same clearance of the surrounding horizontal squish surface bounded by the vertical combustion chamber wall portion 25; this squish boundary 25 is best viewed in FIG. 2, and FIG. 2 also shows the squish faces of the valves 22 and 23 directly because section A—A is in fact taken along the parting line of the cylinder head 17 from the cylinder bore 13. Obviously then, the intake valves 22 and 23 both contribute essentially all of their circular face areas to the overall squish area 19. Because these flat, squish faces of the poppet valves 22 and 23 are parallel to the flat crown surface 20 of the piston 12, the stems (not explicitly shown) of these valves 22 and 23 are parallel to the geometric axis of the cylinder bore 13; the flat piston crown surface 20 is of course perpendicular to the axis of the bore 13. (Due to this simple configuration with a completely flat top 20, the piston 12 can be light in weight and will have minimum area exposed to combustion temperatures.) Also parallel to the axis of the cylinder bore 13 is the stem of the single exhaust valve 26. As shown, the face of this exhaust valve 26 is parallel to the faces of the intake valves 22 and 23, and therefore is also parallel to the piston crown surface 20.

Since the accepted definition of the combustion chamber volume in an internal combustion engine includes the volume remaining when the piston 12 occupies its top-dead-center position, but not any of the volume swept by the piston 12, the face of the exhaust valve 26 contributes to the boundary surface for the combustion chamber of the one-cylinder portion 10. Conversely, the surfaces of the squish area 19 and of the portion of the piston crown surface 20 that cooperates with the squish area 19 to provide enhancement of turbulence intensity during combustion in the cylinder 10 are not herein defined to be boundary surfaces for the combustion chamber of the cylinder 10. This definition is consistent with the fact that combustion of a gasoline-air mixture could not easily proceed into the clearance volume associated with the squish area 19 when the piston 12 is at top dead center; this is plain from the former designation of squish area as quench area. In short, combustion chamber boundary surfaces and squish area surfaces (of the piston 12 as well as of the cylinder head 17) are herein defined to be mutually exclusive: the same surface cannot be both. This is also consistent with the accepted definition of a "compact combustion chamber" as having a moderate surface area, not including squish area, relative to its top-dead-center cylinder volume.

As already explained, the circular face of the closed exhaust valve 26 lies in a geometric plane parallel to the plane that contains the faces of the intake valves 22 and 23 when they are also closed. If a bore and stroke each equal to three inches are combined with a 12 to one mechanical compression ratio and 60 percent squish area for the cylinder 10, the separation between these two valve-face planes will be 0.625 inch, or nearly 21 percent of the assumed bore and stroke dimension. This 0.625 inch separation clearly dwarfs the approximately 0.030 to 0.040 inch minimum clearance between the squish area 19 and the piston crown surface 20 and would also normally keep the face of the exhaust valve 26 from ever protruding out of the actual combustion chamber volume of the cylinder 10. The shape of the vertical combustion chamber wall portion 25 as seen in FIG. 2 verifies that the exhaust valve 26 nevertheless benefits from a flow relief volume portion containing the spark plug 30, and from a symmetrically-shaped flow relief portion on the opposite side of the large exhaust valve 26. FIG. 2 shows the spark plug 30 in a peripheral location where its electrodes may conveniently be positioned downward from the plane containing the face of the closed exhaust valve 26. Such positioning of the spark plug 30 helps ensure that its electrodes will not be surrounded by residual exhaust gas at the time of ignition.

As emphasized in FIG. 2, this spark plug 30 is the only feature that prevents the entire one-cylinder portion 10 from achieving perfect structural symmetry about a geometric plane which is perpendicular to the plane of FIG. 2, passes midway between the faces of the intake valves 22 and 23, and bisects the circular face of the single exhaust valve 26. This plane of near-symmetry has critical importance for the preferred embodiment because it is also the theoretical boundary of charge stratification for the cylinder 10.

In more detail of this charge stratification, FIG. 2 portrays the primary fuel injector 35 as spraying gasoline into the primary intake passage 36 while the secondary fuel injector 37 remains continuously dormant. FIG. 1 further indicates that the identical intake passages 36 and 38 incorporate design features for generating in the cylinder 10 the type of swirl known as barrel swirl or tumble. The axis of rotation of this barrel swirl is not the geometric axis of the cylinder bore 13, but rather is parallel to the axis of the piston pin 15. The disclosure of U.S. Pat. No. 5,237,974 explains how the intake passages 36 and 38 may be shaped and angled to promote barrel swirl, and this prior art patent disclosure is therefore incorporated herein by reference. It should be emphasized, however, that the chief purpose of barrel swirl in the present invention is not to enhance burn rate, but rather to promote stratification of air-fuel charge in the cylinder 10 at the time of ignition by the spark plug 30. An ancillary purpose of barrel swirl in the cylinder 10 is to promote more even distribution of fuel within the richer mixture zone represented as the top half in FIG. 2 of the outer circle corresponding to the cylinder bore 13. Since the present invention does rely on squish area rather than on swirl to enhance the charge burn rate, it is not likely to need barrel swirl as powerful as is utilized by known stratified charge engines that depend on this type of swirl.

In sharp contrast to the barrel-stratified-charge engines of U.S. Pat. Nos. 5,050,557, 5,295,464 and 5,237,974, the barrel-stratified engine of FIGS. 1 and 2 relies on neither a central spark plug location nor the large-scale turbulence of barrel swirl to increase the burn rate of air-fuel charge. Instead, the present invention utilizes accentuated small-scale turbulence as provided by the extensive squish area 19. With the need for a centrally located spark plug thus obviated, the embodiment of FIGS. 1 and 2 makes no sacrifice in the ample size of the single exhaust valve 26. This contrasts with the disclosure in U.S. Pat. No. 5,050,557 of a three-valve, barrel-stratified combustion chamber in which the single exhaust valve becomes in essence one of the small exhaust valves of a four-valve pentroof combustion chamber, so that a single spark plug can occupy the somewhat more central location formerly occupied by the other exhaust valve. While the three valves shown in FIGS. 1 and 2 would provide a good approximation of the free breathing characteristics of a four-valve combustion chamber, removing one exhaust valve from a four-valve configuration would severely compromise engine breathing.

Apparently realizing this shortcoming, the assignee of the foregoing patent has seemingly abandoned the three-valve layout in favor of the four-valve stratified combustion chamber disclosed in U.S. Pat. No. 5,295,464. This prior art four-valve configuration, like the five-valve layout in U.S. Pat. No. 5,237,974, has a different shortcoming in that the three-zone barrel stratification with a central rich mixture zone flanked by two lean zones (as obtained by adding fuel through only the center one of three intake valves in a five-valve configuration) is not as pronounced or as easily maintained as the two-zone stratification which is inherently compatible with a three-valve combustion chamber. SAE paper 940986, authored by employees of the assignee of the foregoing three patents, reports empirical and simulated data which confirm this observation about the relative merits of these two different types of barrel stratification.

In spite of the good breathing characteristics and fast burn rate that would normally accrue to a combustion chamber having the high percentage of squish area and valve sizes already described with reference to FIGS. 1 and 2, variations of the present invention would employ four and five poppet valves per engine cylinder. For example, a four-valve version of the present invention would again place its two intake valves wholly within a large squish area, with the stems of all four valves being parallel to the cylinder axis and with the exhaust valves located in the roof of the combustion chamber. Intake port dividers, as in U.S. Pat. No. 5,295,464 would be instrumental in creating barrel stratification, but the single spark plug would be displaced toward the circumference of the cylinder and located on a radial line between the two exhaust valves.

Additional details relating to FIGS. 1 and 2 are as follows. First, there is currently some confusion surrounding the terms, "port" and "runner," as applied to internal combustion engines. The word, "port," actually means an opening and therefore does not strictly apply to the full length of an intake or exhaust passage as completely contained within the cylinder head portion of an engine. Even so, "intake port" is the term often used to distinguish the portion of an intake passage in the cylinder head of an engine from the upstream portion of the same passage, usually called the "intake runner." To avoid such confusion, the term, "intake passage," is used herein to describe the full length of an individual and separate intake passage leading to a single poppet valve, without regard for whether some portion of that full length extends upstream of a cylinder head casting. The same basic reasoning applies to the exhaust passage 50 serving the single exhaust valve 26, but FIG. 1 includes the term, "tumble port," thereon because it is an established term which emphasizes that the shape and approach angle of the portion of the intake passage closest to the intake valve are most important for inducing tumble in the cylinder 10.

Next, the single overhead camshaft 51 is seen in FIG. 1 to actuate the exhaust valve 26 through a finger type follower assembly 52. This follower 52 incorporates a needle-bearing roller 53 in order that contact friction between the camshaft 51 and follower 52 be rolling friction rather than energy-consuming sliding friction. A hydraulic zero-lash pivot 54 supports the follower 52 on the lefthand-side of the cylinder head 17 as viewed in FIG. 1.

Although they are not shown in the drawing, one finger-type follower for each of the two intake valves 27 and 23 has its hydraulic pivot on the righthand side of the cylinder head 17 so that the three followers of the one cylinder 10 have pivot locations that alternate from right to left and back to right. FIG. 2 suggests the convenience of this arrangement with the two intake followers flanking the exhaust follower 52. Furthermore, this alternating pivot layout allows the single camshaft 51 to serve every popper valve in all engine cylinders in the same cylinder bank with the cylinder 10.

The alternating-pivot arrangement just explained can be applied to a variation of the present invention with five valves per combustion chamber, but not as conveniently as to the three-valve variation because the three-valve chamber generally provides more space for each finger-type cam follower. Retaining just the single overhead camshaft in a four-valve variation of the present invention would require a forked center follower for actuating both exhaust valves, in addition to distinct angling of the intake followers away from being perpendicular to the associated camshaft. In any case, having all poppet valve stems parallel to each other is the feature which facilitates a low-friction and relatively simple valvetrain.

An alternative valvetrain arrangement for the present invention is simpler yet, but has higher frictional losses and requires some modification of combustion chamber shape. To be more specific, the two intake valves 22 and 23 would still have their stems parallel to the geometric axis of the cylinder bore 13, to thereby retain the large squish area 19 achieved in concert with the flat-topped piston 12. The intake valves 22 and 23 would, however, now be actuated directly by a single overhead camshaft, and the single exhaust valve 26 would now angle toward this single overhead camshaft to also be directly actuated by it. In other words, the face of the exhaust valve 26 would no longer be parallel to the piston crown 20. To facilitate clearance between adjacent valve springs, the valve stem portions above the valve spring retainers would be extended to well beyond the extra length illustrated by the extension 26a of the exhaust valve 26. (This stem extension 26a need only be long enough to provide the follower 52 with clearance of the valve springs and retainers for the intake valves 22 and 23 when the exhaust valve 26 is fully open. In reality, similarly extended stems of the intake valves 22 and 23 would affect this clearance for the exhaust follower roller 53, as well as the clearance needed for the intake rollers when the intake valves 22 and 23 are fully open.)

Finally, the camshaft 51 would employ identical timing and lift profiles for the two intake valves 22 and 23 in the interest of symmetric flow into the cylinder 10. The camshaft 51 would also employ valve timing that avoids any overlap whatsoever between opening of the exhaust valve 26 and the two intake valves 22 and 23. Valve overlap could be employed if it were appropriately delayed past top dead center, but zero valve overlap has an unexpected benefit in the case of the present invention. The usual benefit of zero overlap is reduced residual exhaust gas dilution of the air-fuel charge, and it does apply to the present invention.

Since the unexpected benefit of zero valve overlap concerns operation of the engine cylinder 10 in its fully stratified mode of operation, this operation will now be considered. Already suggested is the fact that the secondary fuel injector 37 never adds any fuel to the air that flows into the cylinder 10 when the engine which includes this cylinder 10 is operating in its fully stratified mode. In preview of FIG. 4, this mode covers a range of brake mean effective pressure (BMEP) limited by the BMEP developed at the transition point, T.

Equivalently stated for the fully stratified mode of engine operation, all fuel consumed in the cylinder 10 is injected by the primary fuel injector 35 and ideally enters the cylinder 10 only with air admitted by the primary intake valve 22. Since valve overlap would contribute to reverse flow of gases in the intake passages 36 and 38, it would also increase the likelihood that some portion of the fuel injected by the primary injector 35 would migrate around the upstream end 60a of the intake passage divider 60 and thus enter the cylinder 10 through the secondary intake passage 38 and secondary intake valve 23. This cross-flow of fuel would have the undesirable effect of making stratification of the air-fuel charge in the cylinder 10 less pronounced.

To take a slightly different viewpoint, the total length over which the intake passages 36 and 38 must remain separated in order to prevent cross-migration of fuel under all stratified-charge operating conditions is more moderate if valve overlap is not employed. Residual exhaust gas in the combustion chamber volume of the cylinder 10 will still expand back into the intake passages 36 and 38 during low-BMEP engine operation, but the extent of the resulting reverse intake flow will be considerably less without valve overlap. Even so, backward movement of fuel injected into the primary intake passage 36 is not the only rather unusual consideration to be taken into account when selecting the length and general shape of the individual intake passages 36 and 38. One consideration which is not unusual is that fuel injected against the back of a closed and warmed up intake valve will vaporize and in the process expand backward into the intake passage.

To introduce the other consideration that is unusual, the theoretical plane of charge stratification for the cylinder 10 has already been noted as being identical with the plane of near-symmetry mentioned with reference to FIG. 2. Only the single spark plug 30 keeps this common plane from defining perfect structural symmetry in FIG. 2. In order that as little fuel as possible will migrate into the "air-only" half of the cylinder 10 after passing the primary intake valve 22, the intake passages 36 and 38 should be mirror images of each other in internal shape and features over their entire length. This symmetry of these passages 36 and 38 of course amounts to an extension of the theoretical plane of near-symmetry beyond the actual combustion chamber and cylinder volume of the cylinder 10. Such extension, in effect of the theoretical plane of stratification, has significance because charge stratification should be maintained as rigorously as practical to ensure continuing strong stratification at the actual time of ignition by the spark plug 30 after partial compression by the piston 12. Which is to say that design of the intake passage even upstream of its individual branches 36 and 38 should be undertaken with the clear understanding that any gas movement across the theoretical plane of charge stratification might be amplified during compression by the piston 12.

Preventing fuel from migrating out of the richer combustion chamber and cylinder zone located above the stratification plane for FIG. 2 has special importance because the flame kernel initiated by the spark plug 30 will develop at a rate much more rapid and much more consistent from combustion cycle to combustion cycle if the charge directly surrounding the spark plug 30 contains fuel in nearly a stoichiometric proportion than if it contains a high percentage of excess air. For example, maintaining perfect stratification while supplying a stoichiometric mixture of gasoline and air through the primary intake valve 22 means that the spark plug 30 can initiate a flame kernel in approximately a 15 to one air-fuel ratio (A/F) while the overall A/F for the cylinder 10 is about 30 to one. The fuel economy advantages of such lean overall air-fuel ratios will be considered later, but it should be appreciated that consistent and stable development of the flame kernel has advantages independent of fuel economy.

To summarize the fully stratified mode of operation for the cylinder 10, it is ideally operation on a stoichiometric air-fuel mixture, but with the fuel absent from half of the total air-fuel charge that actually fills the cylinder 10 during each four-stroke combustion cycle. Moreover, the spark plug 30 is located well within the stoichiometric half of the cylinder charge so that the coefficient of variation for combustion pressure in the cylinder 10 as a function of crankangle always remains low, especially if valve overlap is not used.

U.S. Pat. No. 5,050,557 and SAE paper #920670 do include data on cylinder pressure for a three-valve, barrel-stratified combustion chamber configuration mentioned earlier as being essentially a pentroof, four-valve layout with the spark plug replacing one of the two exhaust valves. FIG. 7 of this SAE paper in particular emphasizes that a spark plug location well off to the side of the combustion chamber, as exemplified by the spark plug 30 in the preferred embodiment, provides stratified combustion that is very consistent from cycle to cycle. Without a significantly large squish area, however, this spark plug location which is so good for consistent combustion is at the very same time quite poor from the standpoint of delivering a burn rate sufficiently fast for high efficiency. (A fast burn rate improves efficiency not only directly, but also indirectly by allowing a higher engine compression ratio.) The preferred embodiment of course abandons the pentroof configuration to thereby afford a squish area 19 which occupies much more than merely a significant percentage of the area of the cylinder bore 13. Which is to say that various prior-art examples of barrel-stratified engines achieve two but not three of the following attributes: (1) an at least relatively fast burn rate, (2) combustion that is very consistent from cycle to cycle and (3) the more pronounced and more easily maintained type of barrel stratification. The present invention secures all three of these attributes.

The fully stratified mode of operation of the embodiment of FIGS. 1 and 2 is preferably utilized for all engine throttle settings from idle to wide open. (It is not shown in the drawing, but the spark-ignition engine which includes the cylinder 10 follows conventional practice by utilizing a central air-throttling valve for simultaneously providing the same density of air for delivery to the intake passages 36 and 38 as well as for delivery to identical intake passages for each of all other engine cylinders. FIG. 1 of U.S. Pat. No. 5,050,557 does illustrate such a central throttle.) Consequently, the highest BMEP obtained at any given engine operating speed in the fully stratified mode will be only in the neighborhood of half of the maximum BMEP available at that given speed. This realization in turn leads to the conclusion that approximately the upper half of the engine BMEP range is available using effectively unthrottled engine operation, but this conclusion will become clear from a discussion of FIG. 4.

Figure 3:
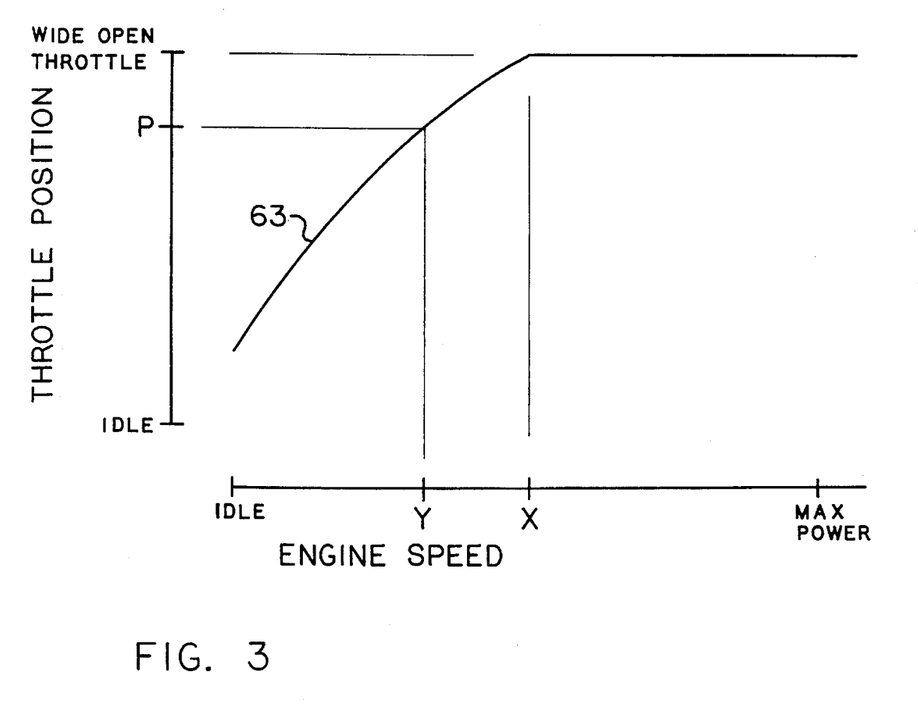
FIG. 3 is a graph illustrating effectively wide open positions of an engine throttle valve associated with an engine which includes the cylinder of FIG. 1.

Turning now to FIG. 3, we will see that an engine throttle valve need not always be in its actually wide open position to have essentially the same effect. In more detail, the horizontal axis in FIG. 3 covers the full range of operating speed for the engine which includes the cylinder 10, and the vertical axis covers the full range of throttle position. The engine which includes the cylinder 10 does follow conventional practice for a throttled, spark-ignition engine in that, during operation with the throttle always at its actually wide open position, the density of air in the engine intake manifold (downstream of the engine throttle valve but upstream of the branched intake passages 36 and 38 in FIG. 2) will not have significantly less absolute pressure than that of the atmosphere surrounding the engine unless the engine is operating at fairly high speed. For instance, at the engine speed, X, in FIG. 3, the engine manifold absolute pressure (MAP) might be less than atmospheric pressure by one-half inch of mercury during operation at wide open throttle. At some distinctly lower engine speed, Y, we find that the engine throttle can be closed somewhat to a less than wide open position, P, without the engine MAP deviating from atmospheric pressure by more than the modest 0.5 inch of mercury experienced at X with the throttle wide open.

Since 0.5 inch of mercury is such a modest loss in MAP, and since even the actually wide open position of the engine throttle does not prevent loss in MAP from exceeding this modest amount over the entire range of engine speed greater than X, we can define the engine throttle to first become effectively wide open for engine speed Y at throttle position P in FIG. 3. Moreover, the curve 63 in FIG. 3 provides all such points for the engine which includes the cylinder 10, except that the throttle must necessarily be in its actually wide open position for all engine speeds greater than X. As a result, the curve 63 is pre-determined for any particular engine simply by the selection of the operating speed X. Choosing X to be in the general vicinity of 50 percent of the engine RPM of maximum power output is reasonable for most passenger car engines, but the overriding concern is that the wide-open-throttle MAP at speed X be acceptably close to atmospheric pressure.

Figure 4:
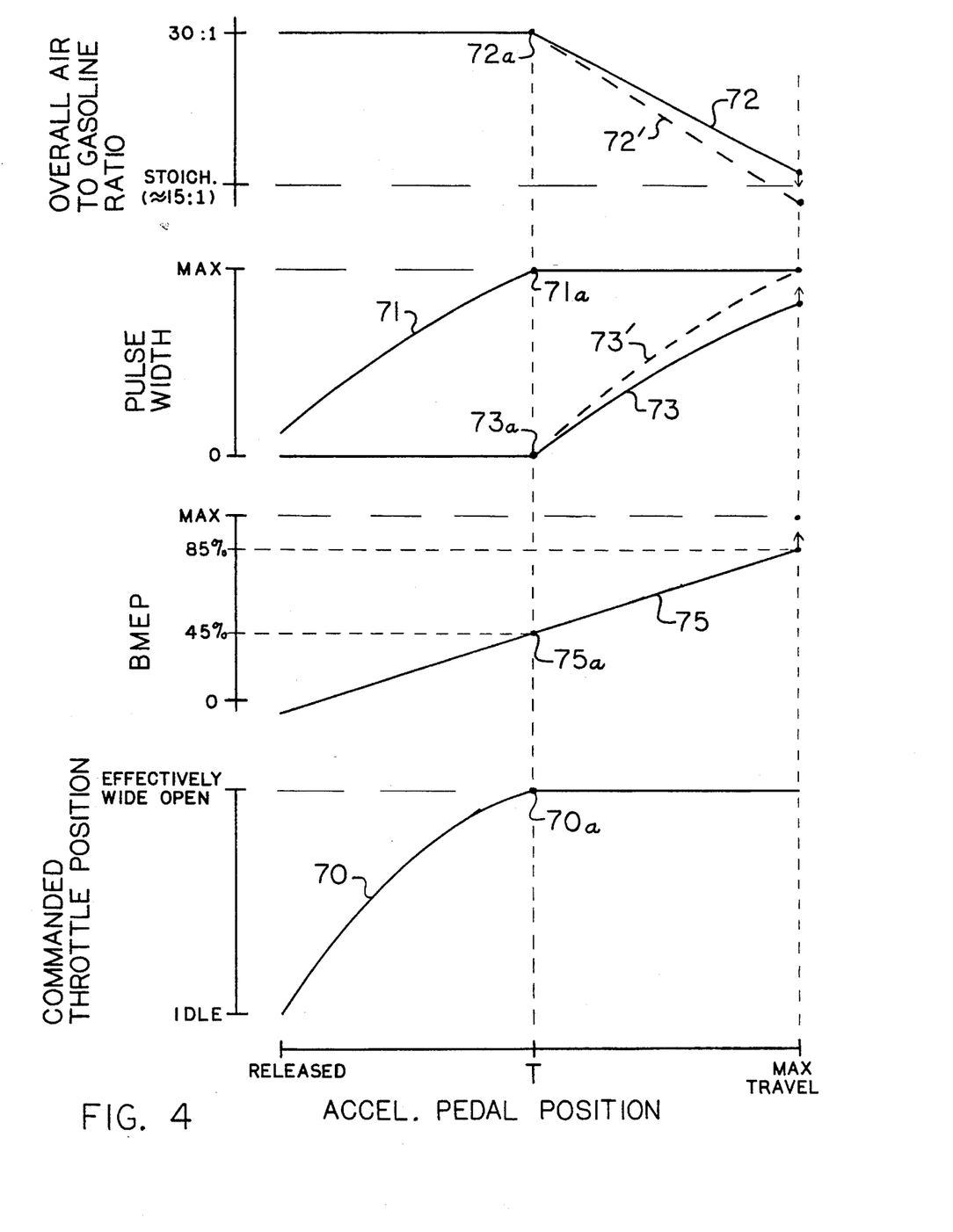
FIG. 4 illustrates the preferred method for operating the engine which includes the cylinder of FIG. 1, as well for operating known stratified charge engines.

Moving now to FIG. 4, all information given in that figure of the drawing applies to just one representative engine speed. In addition, all this information applies to the engine which includes the cylinder 10.

The transition point, T, in FIG. 4 was mentioned earlier as being an upper limit in BMEP for the fully stratified mode of engine operation as already explained for the preferred embodiment. FIG. 4 now represents that T in fact corresponds to a particular position of the accelerator pedal in a passenger car powered by the engine which includes the cylinder 10. This position T, and all other positions of the accelerator pedal, would be read by a suitable sensor, but these and other necessary drive-by-wire throttle components are not shown in the accompanying drawing because my U.S. Pat. No. 4,905,544 provides a comprehensive disclosure incorporated herein by reference. In reality then, the horizontal axis of FIG. 4 designates the output from a sensor reading accelerator pedal position.

The curve 70 shows that the commanded throttle position is effectively wide open for all positions of pedal travel greater than T and less than effectively wide open for all positions less than T; the points 70a, 71a, 72a, 73a and 75a all correspond to pedal travel T. As FIG. 3 indicates, the particular throttle position commanded for effectively wide open throttle engine operation will depend on the specific engine speed represented in FIG. 4. Not opening the throttle significantly past effectively wide open helps decrease overall system response time at the lower engine speeds where an effectively wide open throttle position is reached at relatively modest throttle opening. Any suitable drive-by-wire throttle actuator can be used in a feedback control arrangement to obtain the commanded throttle position 70.

Since the primary engine fuel injectors exemplified by the primary injector 35 in FIG. 2 are to be controlled basically as in a conventional speed-density or mass-air-flow-sensor electronic fuel injection system, the pulse width for these primary injectors will increase, at constant engine speed, as throttle opening is increased toward the effectively wide open position for that constant speed. The curve 71 illustrates this increase, but it does not directly indicate any modification of pulse width for transient engine response because one of the known advantages of drive-by-wire control is that it allows reduction or even complete elimination of "acceleration enrichment" time additions to fuel injector pulse width. This feature arises from the opportunity for limiting the maximum rate of change of throttle position to far less than the corresponding maximum rate of change occurring at the accelerator pedal itself without the result being very noticeable to most passenger car drivers.

Nevertheless, curve 72, of overall air-fuel ratio, does reveal that the fuel injection system for the primary injectors exemplified by the injector 35 has an unusual calibration, but this is not surprising in view of the fact that fully stratified engine operation as already discussed ideally takes place at an overall A/F about twice the stoichiometric value. As further indicated by the pulse width curve 71, the pulse width supplied to the primary injector 35 remains at the maximum value for the example engine speed of FIG. 4 whenever the accelerator pedal travel 70 is greater than T. This maximum pulse width will usually change with engine speed.

Curve 73 in FIG. 4 verifies what has already been explained for the secondary fuel injector 37, namely, that its pulse width remains zero for all values of accelerator pedal travel less than T. To accommodate rapid accelerator pedal movements, the pulse width for the secondary injectors like the injector 37 can simply be kept at zero until the actual throttle position first becomes effectively wide open. After that occurrence, the ramping up of pulse width in accordance with curve 73 can proceed as quickly as electronically possible with no regard for acceleration enrichment of pulse width. No acceleration enrichment is required in response purely to accelerator pedal movements made entirely within the range greater than T because such movements do not themselves significantly change engine intake air flow. Exceptionally rapid changes in engine speed might require some acceleration enrichment of the secondary pulse width 73, and optimum ignition spark timing might vary with secondary pulse width 73.

Like the primary pulse width 71, the secondary pulse width 73 has a maximum value that will normally vary at least somewhat with engine speed, and an optional feature of this curve 73 is that it may jump discontinuously to its maximum value at the very last increment of accelerator pedal travel. The curve 73 as shown does exhibit this feature, but a completely continuous progression of secondary pulse width to its maximum value is revealed by the alternative curve segment 73 prime.

The purpose of a discontinuous jump from a distinctly leaner than stoichiometric mixture admitted through the secondary intake valve 23 to a distinctly richer than stoichiometric mixture is to help avoid autoignition of end gas in the cylinder 10. The A/F curves 72 and 72 prime also show engine calibration with and without, respectively, this optional feature.

It is interesting to note with regard to autoignition of end gases that an overall A/F of, for instance, 18 to one provides more protection against autoignition than would normally be associated with this A/F. Two factors contribute to this unexpected benefit. First, the expansion-velocity component of flame speed would not suffer nearly the same deterioration experienced in homogeneous-charge engines during lean operation because fuel is more concentrated in the nearly-stoichiometric part of the charge burned first and located on the upper side of the theoretical stratification plane of FIG. 2. Second, an overall A/F of 18 to one means that the end gas, in the leaner half of the charge, is much more diluted with excess air than would be the case in a homogeneous-charge engine operating on the same A/F.

The foregoing comments about autoignition lead quite naturally to important conclusions concerning enhanced engine operating efficiency. A supercharged engine (either crankshaft driven or exhaust turbine driven) designed according to FIGS. 1 through 4 could employ an unexpectedly high mechanical compression ratio for a given maximum boost pressure if the BMEP curve 75 in FIG. 4 were to have its absolute maximum value limited by an overall gasoline A/F of roughly 21 or 22 to one. This approach is generally more acceptable for a supercharged engine because extra boost pressure can be utilized to compensate for torque loss due to dilution of the air-fuel charge. Also contributing to a higher than expected compression ratio for both naturally aspirated and supercharged variations of the present invention is the fast burn rate that would result from the extensive squish area 19. Such burn rate enhancement via squish area can be used to compensate for the reduced laminar flame speed displayed by natural gas and other gaseous fuels in comparison to gasoline. If the burn rate of the embodiment of FIGS. 1 and 2 causes excessive combustion noise for use in gasoline-fueled passenger cars, then sound encapsulation can be utilized by itself or in combination with a reduction in the effectiveness of an appropriate part of the squish area 19. Increasing the squish clearance distance from 0.030 inch or so to 0.060 inch or more will realize the desired result and at the same time retain the basic combustion chamber shape disclosed.

The BMEP plot 75 in FIG. 4 does exhibit the optional feature represented by discontinuity of the curves 72 and 73. Just before its jump to maximum BMEP, the plot 75 reaches an example "sub-maximum" value of 85 percent of the true maximum BMEP for the engine speed represented in FIG. 4. This 85 percent value compares to the example value of 45 percent of the true maximum BMEP that may also be produced with the engine throttle effectively wide open, thus offering a continuous range of from 45 to 85 percent of true maximum BMEP with no throttling losses. (Less than 50 percent of true maximum BMEP will usually be available at the transition to effectively wide open throttle operation because engine frictional and throttling losses do not subside significantly as accelerator pedal travel drops toward T.)

Earlier discussion focused on the importance of certain engine design features such as keeping the intake passages 36 and 38 separate over an unusually long distance in order to help produce and maintain more pronounced stratification. Low to negative BMEP engine operation will accentuate the benefit of long, separate intake passages 36 and 38 because residual exhaust gas in the cylinder 10 will flow backward more vigorously into the passages 36 and 38 when engine manifold absolute pressure is low. It is possible to accommodate this difficulty with an alternative approach of either sequential injection of fuel only after backward flow has ceased, or enriching the leftmost portion of the A/F curve 72. When using enrichment, preserving the 30 to one gasoline A/F for the curve 72 as T is approached will still preserve the wide, continuous unthrottled range from 45 to 85 percent of maximum BMEP even if the A/F at and near engine idle is distinctly richer than a 30 to one A/F.

Nevertheless, addressing the problem of reverse flow in the intake passages 36 and 38 in a way that allows the A/F curve 77 to retain its full BMEP range of 30 to one A/F engine operation may well prove essential to liquid-fueled applications of the present invention in which cold-start exhaust emissions are crucial. Which is to say that zero valve overlap and long, separate intake passages 36 and 38 would likely be necessary. An interesting alternative to long passages 36 and 38 is employing one intake manifold or surge tank for all primary passages like the passage 36 and a separate but essentially identical intake manifold or surge tank for all secondary passages like the passage 38.

In more detail now of cold starts, all A/F enrichment should be added via the primary injectors exemplified by the primary fuel injector 35 so that all of this extra fuel will be effective in assisting the spark plug 30 to initiate combustion. If the charge stratification is pronounced enough that a 30 to one gasoline A/F yields good warm-engine performance at low and negative BMEP, then less extra fuel will be needed for cold starts and more excess air will be available for oxidizing the extra fuel both in the cylinder 10 and after exiting the cylinder 10. Since cold-start emissions of hydrocarbons and carbon monoxide have such a pervasive influence on overall Federal Test Procedure exhaust emission results, the tendency of high-squish combustion chamber configurations to generate higher levels of hydrocarbon emissions during warm-engine operation should thus be more than offset.

With respect to generating very pronounced stratification to aid in reducing cold-start exhaust emissions, it is interesting to note that combustion tends to itself destroy this stratification. Prior to combustion, all fuel will ideally be contained in the half of the cylinder 10 which includes the spark plug 30, but expansion of combustion products from the vicinity of the spark plug 30 will push remaining rich air-fuel charge into the air-only side of the cylinder 10. This motion will of course help mix still unburned "enrichment fuel" with the excess air in the air-only side of the cylinder 10. Not only will this process cause oxidation of carbon monoxide and hydrocarbons that would exit the cylinders of a homogeneous charge engine as exhaust pollutants, but it will extract useful mechanical energy from these pollutants. Consequently the amount of air-fuel charge that must be enriched in the first place is lessened via a throttle position more closed than normally expected for engine operation following a cold start. In fact, cold-start enrichment should provide an inherent and significant fast-idle effect without the engine throttle being any more open than for warm-engine idling. If the effect is pronounced enough, the throttle would actually have to be closed slightly during idling after a cold start.

The implications for reduced exhaust emissions are clear for performing most or even all of the engine warm-up process on overall air-fuel ratios at or leaner than stoichiometric. This objective underscores beyond any doubt the importance of engine design features like zero valve overlap.

In review now of the method of stratified-charge engine operation represented by FIG. 4, this method could be applied, for example, to a dual-fuel-injector variation of the engine disclosed in U.S. Pat. No. 5,050,557 or to the engine of U.S. Pat. No. 5,237,973, as well as to the preferred embodiment of the present FIGS. 1 and 2. At all BMEP levels less than the 45 percent of maximum developed at point 75a on curve 75, pronounced stratification of the air-fuel charge exists in the cylinder 10 because all fuel is injected through the primary fuel injector 35 and because the cylinder 10 has the stratified-charge features already described. As mentioned previously, the engine design objectives for warm-engine operation further include fast and consistent combustion throughout the full range of throttle opening with the secondary fuel injector 37 dormant and the primary injector 35 metering a stoichiometric A/F based on the air admitted to the cylinder 10 only through the primary intake passage 36 and its associated primary intake valve 22. As denoted by point 75a, this type of fully stratified operation will usually make somewhat less than half of maximum BMEP available as its upper limit in the case of a naturally aspirated engine calibrated to include enrichment well past the stoichiometric overall A/F.

Like the foregoing engine operation extending to the lefthand side of the points 70a, 71a, 72a, 73a and 75a in FIG. 4, operation extending to the right of these four points offers a broad and continuous range of BMEP and thus of engine brake torque. The lefthand BMEP range opens the engine throttle as the means of producing increases in brake torque via greater density of the combustion air which has filled the cylinder 10 upon closing of the intake valves 22 and 23. When the throttle first becomes effectively wide open, this initial mode of engine torque regulation is no longer available, and the righthand BMEP range is therefore enabled by activating the secondary fuel injectors exemplified by the secondary injector 31. This technique of course reduces the degree of stratification existing across the plane of theoretical stratification, but the extra engine torque range of from 45 to 85 percent (in this example) becomes available in its entirety without throttling losses. Moreover, all of this righthand range would still benefit from the usual advantages displayed by engine operation with the excess air of lean combustion. (U.S. Pat. No. 5,237,973 discloses a method of engine torque regulation which, like the two-stage method of FIGS. 3 and 4 herein, utilizes variable charge stratification in concert with throttling. Since this prior art method is not a two-stage method, it foregoes the benefit of completely eliminating throttling losses over a quite wide range of engine brake torque output.)

As an example of how the foregoing method of engine torque regulation would apply to a supercharged engine, a basic arrangement suggested by the production passenger car system described in SAE paper 910685 is assumed. In this arrangement, an air-bypass can close, only when the engine throttle is already effectively wide open, to prevent air from recirculating from the supercharger outlet back to its inlet. Which is to say that the engine throttle valve and the supercharger bypass valve cooperate in such a way that they together constitute an overall system for regulating the density of combustion air throughout a range that includes pressure boosted well above atmospheric pressure. In this case, the entire range of BMEP to the right of point 75a on curve 75 would be realized not only with the engine throttle effectively wide open, but with the supercharger bypass valve closed to provide full boost pressure. Furthermore, a righthand segment of the part of the curve 75 to the left of the point 75a would now also be obtained with the engine throttle effectively wide open, but with the supercharger bypass valve being used to regulate combustion air density.

Since most domestic passenger cars have automatic transmissions, the following comments are germane. To begin the discussion, known electronic powertrain control techniques include using both retarded spark timing and fuel injection shutoff of selected engine cylinders to curtail engine torque output briefly during the inertia phase of automatic transmission upshifts. These electronically controlled parameters yield very fast response for reducing engine torque and can therefore also be utilized in traction control and transmission overtorque protection strategies. Nevertheless, the advantageous type of drive-by-wire throttle control disclosed in U.S. Pat. No. 4,905,544 (incorporated herein) would benefit from very short response times for torque increases as well as for torque decreases. In particular, the drop in engine speed associated with a transmission upshift necessitates an offsetting increase in engine torque output if the advantages of having accelerator pedal position command engine power output are to be realized. However, this offsetting increase in engine torque should occur only after the inertia phase of the upshift is completed, and the inertia phase itself will require a brief torque reduction. The present invention can facilitate these rapid torque changes.

Already noted is the fact that both positive and negative torque response within the range to the right of point 75a in FIG. 4 can be extremely rapid because the engine throttle remains effectively wide open while the curve 73 of secondary pulse width provides the needed adjustments in torque. During the inertia or speed-change phase of an upshift, however, the position occupied along the curve 63 in FIG. 3 will be rapidly shifted to the left. This means that a specific throttle position initially less than effectively wide open can become effectively wide open just by virtue of the engine speed loss caused by the upshift. In this way, the range of very rapid increase in engine torque being available for offsetting the RPM drop of an upshift is extended to the left of point 75a.

Nevertheless, intentional reduction of engine torque is needed very briefly during the interval when engine speed is actually dropping. Consequently, the usual techniques of using ignition spark timing retard and fuel injector shutoff of selected cylinders may be even more beneficial than in completely conventional powertrain control strategies. As an alternative or adjunct to injection shutoff and spark retard, it may be possible to operate the cylinder 10 on a 40 to one or even leaner overall gasoline A/F by reducing primary fuel injected while still maintaining secondary fuel injected at zero. When applied to all cylinders of an engine according to the present invention, this concept would render smoother engine operation than complete shutoff of injection to selected cylinders.

Returning now to FIG. 4 in general, we recall that the curve 71 of pulse width for the primary injectors like the injector 35 is implemented by a basically conventional approach to fuel injection control. In other words, the curve 71 is the part of a three-dimensional data surface used at just one engine speed. Similarly, the BMEP curve 75 is just the intersection of a geometric plane at constant engine speed with a three-dimensional data surface of BMEP versus engine speed and accelerator pedal position, but this BMEP data is not actually needed for the operation according to FIG. 4 as previously explained. This operation can be considered to be "torque pedal" operation because, for instance, the engine torque produced at a constant 30 to one A/F and effectively wide open throttle, that is, produced at the pedal position T, will remain fairly independent of engine speed. This type of control is not at all suitable for the drive-by-wire control disclosed in U.S. Pat. No. 4,905,544 and preferred for use with automatic transmissions.

In order that accelerator pedal position accurately command engine power output, rather than command an approximation of torque output, the throttle position curve 70 and the fuel injection curves 71 and 73 must be addressed at the location of the BMEP needed to provide the commanded power at the existing engine speed. This of course requires calculation of the needed BMEP and referencing of the curves 70 and 73—as curves commanding the desired throttle position and secondary fuel injector pulse width-to the commanded BMEP. Which is to say that BMEP is added to the three-dimensional data that must be stored in digital electronic memory, and the curves 70 and 73 must become curves of commanded throttle position and commanded secondary injector pulse width, respectively, as a function of measured engine speed and commanded BMEP (as determined from measured engine speed and commanded power output). This digital memory would be included in the electronic control module 14 of FIG. 1 in the incorporated disclosure of U.S. Pat. No. 4,905,544; also shown in this incorporated drawing figure is the general arrangement of components needed for implementing the drive-by-wire control strategy of the present FIG. 4.

Considering now the advantages usually attributed to leanburn engines, we will in addition see how these advantages are enhanced by the stratified charge engine of FIGS. 1 and 2 and by the two-stage method of engine torque regulation represented in FIGS. 3 and 4. Reduced air pumping loss usually comes to mind first when considering leanburn engine operation, but this is by no means a dominant contributor to the overall efficiency gain promised by the embodiment of FIGS. 1 through 4. At the same time though, this overall gain does depend significantly on the broad, upper range of brake torque produced with the engine throttle at least effectively wide open. Other engines, for instance the Diesel, of course achieve the same benefit, but completely unthrottled engine operation necessitates overall A/F values much greater numerically than would ever be used in the present invention. These high values of A/F in turn create difficulty at low BMEP for catalytic treatment of exhaust gas.

Even though the upper range of BMEP for the present invention is characterized most strongly by the absence of throttling losses, it is by no means devoid of the efficiency benefits emphasized in the throttled and fully stratified range of BMEP to the left of point 75a in FIG. 4. Because of the consistently high percentage of excess air in this range of lower engine BMEP, reduced combustion temperatures moderate heat transfer from the hot, expanding combustion products to the engine's cooling system. On the molecular level, these lower combustion temperatures again provide benefits—less dissociation and fewer non-translational energy states of the molecules themselves.

Another benefit of the excess air of lean combustion is that its presence in unburned end gas makes the gas more resistant to autoignition, thereby promoting the utilization of a higher engine compression ratio. The faster burn rate arising from a high percentage of squish area further promotes a high compression ratio.

Homogeneous-charge engines will exploit several of the foregoing benefits to a significant extent when operated with excess air, but excess air also reduces the expansion-velocity component of flame speed. This unfortunate result reduces engine efficiency directly as well as indirectly through a less pronounced increase in compression ratio. In contrast to homogeneous-charge engines, the present invention tends to divide the overall burn into a first part, with no excess air, and a second part into which excess air is concentrated and which therefore has added resistance to autoignition. Since the overall effect on burn rate of reduced expansion velocity is seen predominantly in the first half of the burn in a homogeneous-charge engine, making the air-fuel charge consumed in the initial part of the burn a stoichiometric charge is especially effective in limiting the degree to which burn rate deteriorates with increasing A/F. Which is to say that the benefits of excess air can be taken to higher levels, at higher values of A/F, before the negative effect of decreasing burn rate begins to dominate.

The more consistent development of cylinder pressure as a function of crankangle gives the present invention further advantages over leanburn engines which consume a homogeneous charge. This more consistent rise in cylinder pressure beginning at the time of the ignition spark avoids a shortcoming from the standpoint of engine efficiency as well as the more obvious fault affecting engine operating smoothness. Since ignition spark timing cannot be varied from cycle to cycle in anticipation of which cycles will experience more of a delay in development of the flame kernel, the actual timing will not be the optimum timing for a substantial percentage of combustion cycles in the case of homogeneous-charge, leanburn engines. At the same time that it solves the foregoing shortcoming of homogeneous-charge leanburn engines, the present invention circumvents most of the extra complexity usually associated with stratified charge engines. In fact, the camshaft layout previously described for the present invention allows just a single overhead camshaft to be used with the finger type of anti-friction cam followers that normally require double overhead camshafts.

Of the foregoing efficiency advantages, only one remains unavailable if cooled and recirculated engine exhaust gas replaces excess air as the intake charge diluent inducted into the "air-only" side of the cylinder 10, which would then be renamed as the "EGR-only" side. This one advantage is that oxygen and nitrogen molecules have fewer non-translational energy states than either the carbon dioxide or the water molecule, and this advantage is more commonly described as being one of specific heat ratio.

The only reason for employing recirculated exhaust gas to replace the excess air of lean combustion is that EGR accommodates the type of catalytic exhaust gas treatment now almost universal for domestic passenger cars and light trucks. Even though zeolite-carrier and other new catalysts are currently being used with leanburn engines in production cars sold in Japan, there is no guarantee that these catalysts will advance to the point of being acceptable for widespread use in the United States with leanburn engines powering passenger cars and light trucks. Accordingly, adaptation of the present invention to incorporate exhaust gas recirculation (EGR) for use with three-way catalysis will now be described.

Beginning with the hardware itself, an EGR valve and associated conduit for exhaust gas would of course be required. An EGR cooler would be beneficial, as would an exhaust gas oxygen (EGO) sensor. The single EGR valve could deliver cooled exhaust gas either individually to the separate secondary intake passages like the passage 38, or in total to a separate intake manifold or "surge tank" joining only the secondary intake passages like the secondary passage 38. In the preferred case of two separate surge tanks, the remaining or primary intake passages would be fed intake air from the other surge tank, and FIG. 8 of U.S. Pat. No. 5,237,973 shows such an arrangement of two separate surge tanks. While this FIG. 8 shows a separate throttle valve for each surge tank, a shared throttle valve assembly is absolutely essential for avoiding gross mismatching of manifold absolute pressure in the two surge tanks. At engine idle for example, only recirculated exhaust gas should enter the secondary surge tank, thereby implying zero pressure drop across a separate throttle valve for the secondary surge tank at the very same time when a large pressure drop would exist across the throttle valve for the primary surge tank. This gross mismatch of manifold absolute pressure would cause so much recirculated exhaust gas to cross over to the opposite side of the engine combustion chambers that acceptable engine operation would be impossible. (Operation of the embodiment of FIGS. 1 through 4 on a 30 to one air to gasoline ratio would likely control nitrogen oxides emissions sufficiently well, especially at engine idle. Consequently, recirculated exhaust gas could probably, as a hybrid alternative, be phased in near the transition BMEP 75a in FIG. 4.)

During "closed loop" or feedback operation, the single EGR valve would meter just enough exhaust gas into the secondary or "EGR-only" surge tank to eliminate free oxygen from the engine exhaust gas as sampled by the EGO sensor. Since a stoichiometric air-fuel mixture would concurrently be provided through the primary surge tank and primary intake valves like the valve 22, this closed-loop operation would provide the same three-way control of exhaust pollutants as in conventional passenger cars. However, this approach does not leave the EGO sensor free for its usual purpose of maintaining the stoichiometric air-fuel ratio.

This remaining problem can be solved by periodically deviating from the method of engine operation represented in FIGS. 3 and 4 just long enough for the EGO sensor to provide needed data. In particular, any BMEP value within the range depicted in FIG. 4 can be developed alternatively with an undiluted stoichiometric mixture being delivered simultaneously through each of the two intake valves 22 and 23 of each engine cylinder 10, which is to say, with absolutely no stratification of the engine intake charge. This periodic updating of pulse width or other data for maintaining the stoichiometric mixture during stratified operation would require modified settings of the throttle and EGR valves (more closed for the engine throttle and fully closed for the EGR valve), and would be repeated more frequently with changes atmospheric temperature and pressure. This same basic technique of briefly and periodically abandoning the method of FIG. 4 can be applied to leanburn variations of the present invention.

Another technique is, in contrast, not easily shared by both the leanburn and the EGR variations of the present invention. This other technique entails rapidly and continuously switching the air-fuel charge dilution back and forth from one side of the cylinder 10 to the other side. In the case of using excess air as the diluent, this is easily accomplished electronically if a secondary spark plug is added to each cylinder 10 so that all combustion chambers would then have perfect structural symmetry. The secondary spark plug can have its own separate spark timing in various schemes for further increasing burn rate. U.S. Pat. No. 5,237,973 discloses the switching technique as a way of keeping temperatures more evenly distributed throughout each engine cylinder, but switching should probably be attenuated or avoided altogether during engine warmup.

Figure 5:
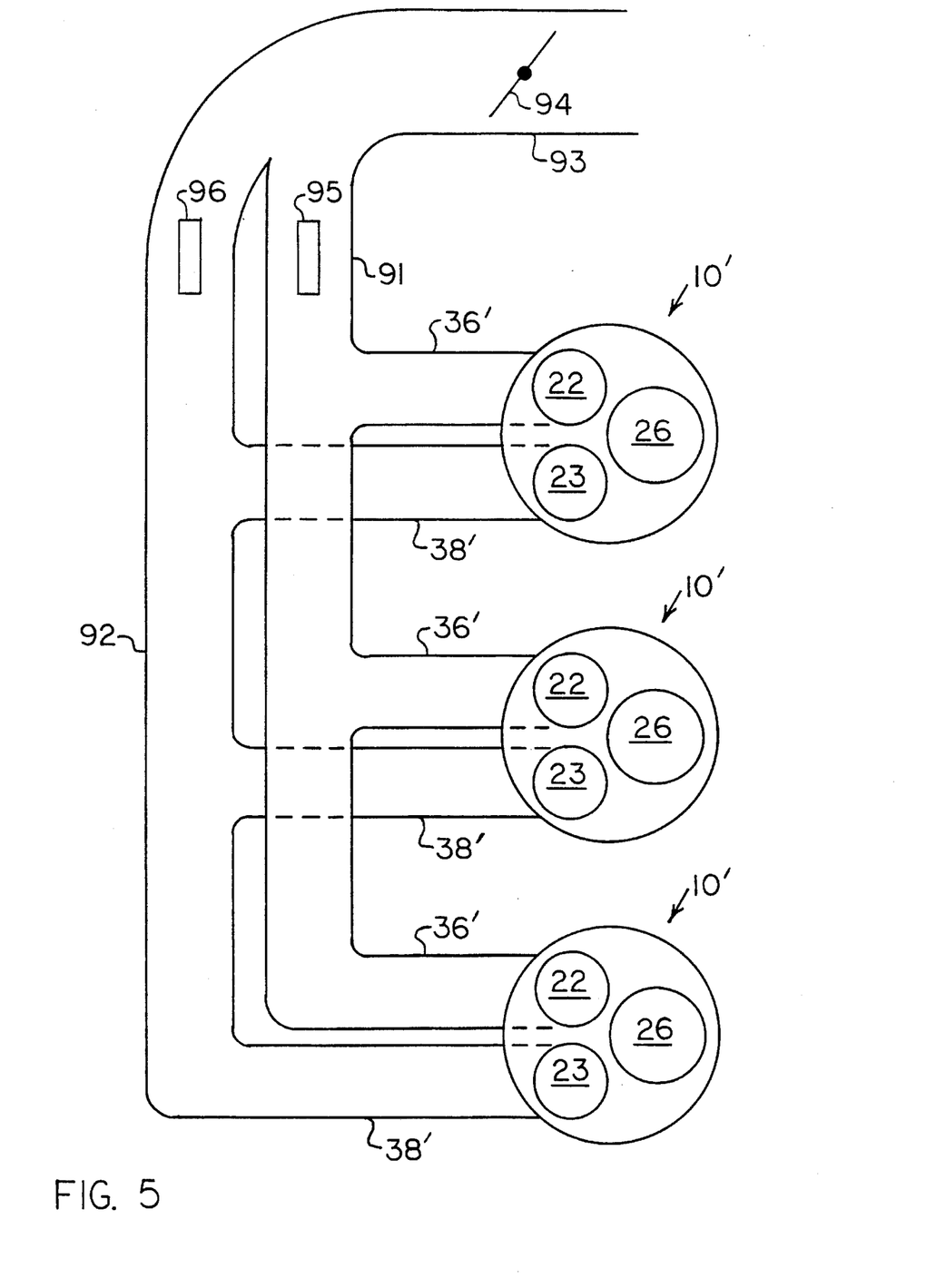
FIG. 5 shows a modification of the embodiment of FIGS. 1 and 2.

Moving now to FIG. 5, we see represented a modification of the preferred embodiment desirable for operation using gaseous fuels such as propane and natural gas. Most notable in FIG. 5 is the dual surge tank feature already mentioned as being preferred when cooled and recirculated exhaust gas replaces excess air as the intake charge diluent. In more detail of FIG. 5, the primary intake passage 36 prime of each cylinder 10 prime of a naturally aspirated, inline three-cylinder engine communicates with the primary surge tank or plenum 91, but not with the secondary surge tank 92. Similarly, each of the three secondary intake passages 38 prime receives intake air from only the secondary surge tank 92. Not evident from FIG. 5 is the fact that the primary passages 36 prime and the secondary passages 38 prime should still be of the same length.

Primes added to the reference numerals for the cylinder 10 and the intake passages 36 and 38 indicate that these items from FIGS. 1 and 2 have now been modified by removing the port-type fuel injectors 35 and 37, and by preventing the intake passages 36 prime and 38 prime from joining at their upstream ends. Nevertheless, the two separate surge tanks 91 and 92 join at their upstream ends to draw engine intake air from a common throttle body 93 which contains the single throttle valve 94. (With this combination of separate surge tanks and a common throttle valve device, an EGR valve could be added to supply large quantities of recirculated exhaust gas to only the secondary surge tank 92 without disturbing the balance of manifold absolute pressure between the two surge tanks 91 and 92.) The primary fuel injector 95 meters fuel into only the primary surge tank 91, and the secondary fuel injector 96 meters fuel into only the secondary surge tank 92.

The basic two-stage strategy of engine torque regulation represented in FIGS. 3 and 4 still governs operation of the preferred embodiment as modified according to FIG. 5. In particular, the throttle position curves 63 and 70 apply to the throttle valve 94, the curve 71 applies to the gaseous fuel injector 95, and the curve 73 applies to the gaseous fuel injector 96.

Since gaseous fuel will not wet the walls of the surge tanks 91 and 92, or of the intake passages 36 prime and 38 prime, use of the plenum-type injectors 95 and 96 is not only simpler than the more numerous port-type injectors 35 and 37, but also provides generally superior air-fuel mixing without incurring the disadvantages associated with wall wetting. The dual surge tank approach of FIG. 5 does provide extra protection against migration of fuel from the primary intake passages 36 prime to the secondary intake passages 38 prime, and this approach can of course be utilized in combination with liquid fuel and the port-type of fuel injectors 35 and 37 shown in FIG. 2. For instance, a very modest amount of valve overlap might become more acceptable, not with the intention of scavenging the combustion chambers of residual exhaust gas, but simply to help accommodate greater valve lift without resorting to more extreme acceleration of the valves 22, 23 and 26. Such modest overlap would have to be retarded from the top dead center position of the piston 12.

In the case of engines fueled with natural gas, plenum-type or central fuel injectors like the injectors 95 and 96 offer an advantage that has been widely exploited for turbo-supercharged engines. This advantage results from injecting the fuel into the engine intake air just before it reaches the compressor wheel of the turbocharger unit, thereby thoroughly homogenizing the air-fuel mixture. However, properly applying this technique to the separate surge tanks 91 and 92 requires that one identical compressor wheel be employed in each of the tanks 91 and 92. These identical compressor wheels (not shown) would of course each have half the flow capacity of the more usual single compressor wheel, but they would both be driven by the same exhaust turbine (not shown). Such modification of the embodiment of FIG. 5 to incorporate two compressor wheels, both fed by the single throttle valve 94 and always driven at the same RPM, would maintain excellent balance of manifold absolute pressure between the surge tanks 91 and 92.

Although exhaust gas recirculation and dual surge tanks exemplify fairly conservative modification of the preferred embodiment of FIGS. 1 through 4, more extreme variations are possible and are in some cases quite interesting. Two more extensive variations in the preferred embodiment will now be outlined.

To introduce the first of these variations, U.S. Pat. No. 5,237,974 confirms that injecting fuel through only the center intake valve of a five-valve combustion chamber will create barrel stratification consisting of a single rich zone flanked by a lean or "air-only" zone on either side. While this alternative configuration of barrel stratification is generally less pronounced and less easily maintained than the barrel stratification of the preferred embodiment, inducting a richer than stoichiometric mixture through the center one of three intake valves will help compensate for unwanted loss of fuel from the rich zone to the flanking lean zones. Since only about one-third of the intake air would flow through the center intake valve, this extra fuel can be added without exceeding the 30 to one overall gasoline A/F used by the preferred embodiment for fully stratified operation. For example, supplying about a 10 to one A/F through the center intake valve and only air through the other two intake valves will realize the 30 to one overall A/F.

The five-valve combustion chamber further offers an interesting modification of its pentroof configuration. Making the three intake valves slightly smaller than normal and arranging them in a straight line would move the center intake valve away from the periphery of the combustion chamber, thereby making room for adding a significant amount of squish area in cooperation with a flat-topped piston.

As the next major variation, the Wankel rotary engine also utilizes the four-stroke combustion cycle, which in this case might more accurately be called the four-event combustion cycle. The Wankel offers a ready opportunity for creating charge stratification by injecting fuel into only one of two mirror-image side intake ports, with at least the leading spark plug(s) being axially offset to the rich side of the rotor housing or even relocated to the flat end plate of the rotor housing. In combination with the Wankel engine's rotor, such ports would of course constitute two separate intake valves, as would a single peripheral port fed by two separate intake passages and with a divider added in its center so that all fuel could be metered into the intake air flowing through just one side.

The case of the divided peripheral intake port, unaided by any side intake ports, would seem especially promising for establishing pronounced stratification bounded by a plane perpendicular to the Wankel engine's eccentric shaft; eliminating the traditional combustion chamber pocket in each of the three faces of the rotor would benefit this type of stratification. A rich central zone, corresponding to the one in the five-valve combustion chamber of U.S. Pat. No. 5,237,974, could even be established by segregating the intake valving arrangement of the Wankel engine into three zones along the axis of the eccentric shaft. Just as in the case of the five-valve stratified chamber for a piston engine, about fifty percent of the fuel needed for a stoichiometric overall A/F could be metered into only thirty-three percent of intake air flow to thereby offset unintentional loss of fuel to the flanking "air-only" mixture zones. Nevertheless, a special advantage would accrue to locating the rich thirty-three percent of intake air directly adjacent one of the flat side plates of the rotor housing. This advantage concerns the need to enhance burn rate by adding at least one additional leading spark plug for each Wankel rotor. Positioning one or more of the leading spark plugs in the side plate would prevent leakage from one chamber to the next as an apex seal passes the location of a side-mounted spark plug. (If, for example, only 33 percent of the fuel required for a stoichiometric A/F were added to a separate peripheral-ported intake passage providing just 20 percent or so of the intake air to each Wankel engine rotor, then the operating strategy of FIGS. 3 and 4 could be modified to have an even wider unthrottled range of BMEP. At the same time, such a modification would reduce exhaust gas temperature during engine operation to the left of point 75a in FIG. 4, but the Wankel engine does tend to have high exhaust gas temperature.)

With the Wankel engine burn rate thus addressed by distributing several leading spark plugs at different angular locations, the remaining problem of applying the present invention to the Wankel engine concerns the excessive duration of exhaust port timing for peripheral ports. Employing only side ports as exhaust ports would obviously solve this duration problem, but a ceramic exhaust passage coating or other means might be required for controlling heat transfer from side exhaust ports. All of the foregoing stratified-charge variations of four-stroke rotary engines could of course be utilized independently of the method of engine operation represented in FIGS. 3 and 4.

The Wankel engine itself illustrates that the accepted definition of "four-stroke internal combustion engine" is based on function rather than on the actual configuration of hardware used to achieve the function. The completely different physical structure of the Wankel rotary engine in comparison to a conventional piston engine proves this assertion. Since ready-made definitions such as "four-stroke internal combustion engine" are often not available in a form sufficiently precise for patent claims, claims can make their own functional definitions by specifying what functions the named element or means is operative to perform. This type of definition is usually described as being "means plus functional language." In any case, variations of the present invention that may be resorted to without departing from the spirit and scope of the following claims are by no means limited to the relatively few variations that have been explicitly described herein.

What is claimed is:

1. A four-stroke, spark-ignition engine comprising:

at least one cylinder, at least two separate intake passages for intermittently conducting gaseous flow into said one cylinder with a tumbling motion about an axis substantially perpendicular to the geometric axis of said one cylinder, at least one exhaust passage for intermittently conducting gaseous flow from said one cylinder, means for closing said one cylinder at one end and for connecting said intake and exhaust passages to said one cylinder, a piston which reciprocates in said cylinder to thereby seal off a variable thermodynamic working volume between a crown portion of said piston and said cylinder closing means, means located opposite said cylinder closing means for reciprocating said piston within said one cylinder, one poppet valve for selectively enabling communication for gaseous flow from each of said at least two intake passages into said one cylinder, at least one poppet valve for selectively enabling communication for gaseous flow from said one cylinder into said at least one exhaust passage, said cylinder closing means cooperating with said piston crown to form a main squish area covering at least 75 percent of the total circular area of all of said intake valves serving said one cylinder, said valve circular area being that which generally faces said piston crown when said reciprocating means is in a position bringing said piston closest to said cylinder closing means, said main squish area also being equal to at least 40 percent of the circular area of said piston; and said cylinder closing means also cooperating with said piston crown to form a combustion chamber volume when said reciprocating means is in said position bringing said piston closest to said cylinder closing means, all circular areas of all of said exhaust valves that serve said one cylinder and generally face said piston crown being included as boundary surfaces of said combustion chamber volume, but said combustion chamber volume boundary surfaces being exclusive from all squish areas formed between said piston crown and said cylinder closing means, means for delivering fuel to said one cylinder in unequal concentrations through said at least two intake passages such that barrel stratification exists in said one cylinder with varying mixture strength at different positions along said axis of tumbling motion, and at least a first spark ignition means located at a position in said combustion chamber volume where said varying mixture strength is distinctly richer than its average value for said one cylinder, said first spark position also being closer to the wall of said one cylinder, including a geometric extension thereof, than to said geometric axis, including an extension thereof, of said one cylinder, whereby combustion in said one cylinder of a charge highly diluted on an overall basis is enhanced by extensive squish action as well as by barrel stratification.

2. The engine of claim 1 wherein the stem of each of said intake and exhaust valves serving said one cylinder is substantially parallel to said geometric axis of said one cylinder.

3. The engine of claim 1 further comprising (a) a single camshaft for actuating all of said intake and exhaust valves serving said one cylinder, and (b) a cam follower operationally connecting said camshaft with each one of all of said intake and exhaust valves serving said one cylinder, each of said cam followers being operationally pivoted at one end and in operating contact (a) with at least one of said intake and exhaust valves generally at the opposite end and (b) with a lobe of said camshaft at a position between said ends of the follower, said pivoted end of each of said cam followers that actuates an intake valve of said one cylinder being operationally disposed on one side of said camshaft and said pivoted end of each of said cam followers that actuates an exhaust valve serving said one cylinder being operationally disposed on the other side of said camshaft.

4. The engine of claim 3 wherein the stem of each of said intake and exhaust valves serving said one cylinder is substantially parallel to said geometric axis of said one cylinder.

5. The engine of claim 1 wherein all of said intake passages serving said one cylinder consist of two substantially identical intake passages.

6. The engine of claim 5 wherein (a) all of said one poppet valve for said at least one exhaust port serving said one cylinder consists of one exhaust valve (b) said fuel delivery means establishes said barrel stratification by delivering, during at least selected operating conditions of the engine, substantially more fuel to said one cylinder through a first of said intake passages than through the second of said intake passages, and (c) said first spark position is substantially opposite said first intake passage.

7. The engine of claim 6 wherein said fuel delivery means delivers no fuel to said one cylinder through said second intake passage during at least selected operating conditions of the engine.

8. The engine of claim 1 wherein said crown portion of said piston is substantially flat and substantially perpendicular to said axis of said one cylinder, and wherein said main squish area covers substantially all of said circular area of all of said intake valves serving said one cylinder.

9. A four-stroke, spark-ignition engine comprising:

at least one cylinder, at least two intake passages for intermittently conducting gaseous flow into said one cylinder with a tumbling motion about an axis substantially perpendicular to the geometric axis of said one cylinder, at least one exhaust passage for intermittently conducting gaseous flow from said one cylinder, means for closing said one cylinder at one end and for connecting said intake and exhaust passages to said one cylinder, a piston which reciprocates in said one cylinder to thereby seal off a variable thermodynamic working volume between a crown portion of said piston and said cylinder closing means, said piston crown being substantially flat and substantially perpendicular to the geometric axis of said one cylinder, means located opposite said cylinder closing means for reciprocating said piston within said one cylinder, one poppet valve for selectively enabling communication for gaseous flow from each of said at least two intake passages into said one cylinder, a stem of each of said intake valve being substantially parallel to said geometric axis of said one cylinder to thereby cause a circular surface of each of said intake valve facing said piston crown to be substantially parallel to said crown, said circular face of each of said intake valve having an intake valve clearance distance separating said circular face from said piston crown when said piston comes closest to said cylinder closing means at the end of a compression stroke in said one cylinder, at least one poppet valve for selectively enabling communication for gaseous flow from said one cylinder into said at least one exhaust passage, a stem of each of said at least one exhaust valve being substantially parallel to said geometric axis of said one cylinder to thereby cause a circular surface of each of said at least one exhaust valve facing said piston crown to be substantially parallel to said crown, said circular face of each of said exhaust valve having an exhaust valve clearance distance separating said circular exhaust valve face from said piston crown when said piston comes closest to said cylinder closing means at the end of said compression stroke in said one cylinder, said exhaust valve clearance distance being at least eight times said intake valve clearance distance, means for delivering fuel to said one cylinder in substantially unequal concentrations through said at least two intake passages such that barrel stratification exists in said one cylinder with varying mixture strength at different positions along said axis of tumbling motion, and at least a first spark ignition means having spark electrodes located in a position where said varying mixture strength is distinctly richer than its average value for said one cylinder.

10. The engine of claim 9 wherein (a) all of said intake passages serving said one cylinder consist of two substantially identical intake passages (b) all of said one poppet valve for said at least one exhaust port serving said one cylinder consists of one exhaust valve (c) said fuel delivery means establishes said barrel stratification by delivering, during at least selected operating conditions of the engine, substantially more fuel to said one cylinder through a first of said intake passages than through the second of said intake passages, and (c) said first spark position is substantially opposite said first intake passage.

11. A method of operating a stratified charge, spark ignition, internal combustion engine in a range of high brake mean effective pressure, the engine having (a) at least one cylinder each with two intake valves and means for individually regulating amounts of fuel added to air flowing separately past the two intake valves into the cylinder, all fuel admitted thereto passing through at least one of the two intake valves and (b) means for varying a common intake charge pressure simultaneously provided to the two intake valves of each cylinder, the method including a first set of operating conditions all applied concurrently in the range of high brake mean effective pressure and comprising:

maintaining the common intake charge pressure at a magnitude selected for maximum brake mean effective pressure operation of the engine at the current operating speed of the engine, flowing only fuel and air past a first of the two intake valves, fuel flowing past said first intake valve being maintained per combustion cycle within plus fifteen percent and minus five percent of a fixed proportion by weight to air flowing past said first intake valve, and regulating brake mean effective pressure within the range of high brake mean effective pressure by varying the amount of fuel flowing past the other of the two intake valves.

12. The method of claim 11 wherein the method further comprises a second set of operating conditions all concurrently applied for operating the engine in a low range of brake mean effective pressure below the high range of brake mean effective pressure, the second set of operating conditions comprising:

flowing only fuel and air past said first intake valve, fuel flowing past said first intake valve being maintained per combustion cycle within plus fifteen percent and minus five percent of said fixed proportion by weight to air flowing past said first intake valve, maintaining the amount of fuel flowing past said other intake valve per combustion cycle at less than ten percent of the amount of fuel flowing past said first intake valve per combustion cycle during engine operation at maximum brake mean effective pressure for current operating speed of the engine, and regulating brake mean effective pressure within the low range of brake mean effective pressure by reducing the common intake charge pressure below the magnitude selected for maximum brake mean effective pressure at the current operating speed, said first and said second set of operating conditions together implementing a full range of brake mean effective pressure from zero to a magnitude selected for maximum brake mean effective pressure operation of the engine at the current operating speed of the engine.

13. The method of claim 11 wherein the two intake valves are identically sized and wherein said operating condition of regulating brake mean effective pressure is implemented by varying the amount of fuel flowing past said other intake valve per combustion cycle within a range extending at least from fifty percent to one hundred percent of the amount of fuel flowing past said first intake valve per combustion cycle during engine operation at maximum brake mean effective pressure for current operating speed of the engine.

14. The method of claim 11 wherein said fixed fuel to air proportion is a stoichiometric proportion.

15. The method of claim 13 wherein said fixed fuel to air proportion is a stoichiometric proportion.

16. The method of claim 11 wherein the two intake valves are identically sized and wherein said operating condition of regulating brake mean effective pressure is implemented by varying the amount of fuel flowing past said other intake valve per combustion cycle within a range extending at least from ten percent to one hundred percent of the amount of fuel flowing past said first intake valve per combustion cycle during engine operation at maximum brake mean effective pressure for current operating speed of the engine.

17. The method of claim 11 wherein the two intake valves are identically sized and wherein said operating condition of regulating brake mean effective pressure is implemented by varying the amount of fuel flowing past said other intake valve per combustion cycle within a range extending at least from zero to one hundred percent of the amount of fuel flowing past said first intake valve per combustion cycle during engine operation at maximum brake mean effective pressure for current operating speed of the engine.

18. The method of claim 11 wherein (a) the means for varying intake charge pressure comprises a throttle valve device for simultaneously providing common intake charge pressure to the two intake valves of each cylinder of the engine and (b) said operating condition of maintaining the common intake charge pressure at a magnitude selected for maximum brake mean effective pressure is implemented by maintaining said throttle valve device at an at least effectively wide open position extending at different engine operating speeds from distinctly less than an actually wide open position of said throttle valve device to said actually wide open position.

19. The method of claim 18 wherein the two intake valves are identically sized and wherein said operating condition of regulating brake mean effective pressure is implemented by varying the amount of fuel flowing past said other intake valve per combustion cycle within a range extending at least from fifty percent to one hundred percent of the amount of fuel flowing past said first intake valve per combustion cycle during engine operation at maximum brake mean effective pressure for current operating speed of the engine.

20. The method of claim 15 wherein the method further comprises a second set of operating conditions all concurrently applied for operating the engine in a low range of brake mean effective pressure below the high range of brake mean effective pressure, the second set of operating conditions comprising:

flowing only fuel and air past said first intake valve, fuel flowing past said first intake valve being maintained per combustion cycle within plus fifteen percent and minus five percent of said fixed proportion by weight to air concurrently flowing past said first intake valve, maintaining the amount of fuel flowing past said other intake valve per combustion cycle at less than ten percent of the amount of fuel flowing past said first intake valve per combustion cycle during engine operation at maximum brake mean effective pressure for current operating speed of the engine, and regulating brake mean effective pressure within the low range of brake mean effective pressure by reducing the common intake charge pressure below the magnitude selected for maximum brake mean effective pressure at the current operating speed, said reduction of the common intake charge pressure extending at least from zero to thirty percent of the magnitude selected for maximum brake mean effective pressure at the current operating speed.

21. The method of claim 20 wherein (a) the means for varying intake charge pressure comprises a throttle valve device for simultaneously providing common intake charge pressure to the two intake valves of each cylinder of the engine, (b) said operating condition of maintaining the common intake charge pressure at a magnitude selected for maximum brake mean effective pressure is implemented by maintaining said throttle valve device at an at least effectively wide open position extending at different engine operating speeds from distinctly less than an actually wide open position of said throttle valve device to said actually wide open position and (c) said reduction of the common intake charge pressure within the low range of brake mean effective pressure is implemented by reducing opening of said throttle valve device.

22. The method of claim 21 wherein said reduction of the common intake charge pressure within the low range of brake mean effective pressure is implemented by reducing opening of said throttle valve device within a range of throttle position extending from effectively wide open to a position used for idling the engine.

23. In an internal combustion engine having at least one cylinder each with (1) a substantially flat-topped piston for reciprocation therein, (2) two substantially identical poppet valves for controlling communication between separate intake passages and said one cylinder and for admitting all fuel and all air consumed in said one cylinder and (3) one poppet valve for releasing all exhaust gas produced in said one cylinder, all three of said poppet valves serving said one cylinder being positioned in an overhead-valve arrangement, the improvement comprising in combination therewith:

a barrel-stratified combustion chamber, employed by each of said at least one cylinder of the engine, with the crown surface of said flat-topped piston having a squish surface portion and a separate portion contributing to a surface bounding said combustion chamber when said piston occupies its top dead center position, each of said two intake valves having a stem positioned in parallel with the geometric axis of said one cylinder such that a geometric plane passing through said cylinder axis defines symmetry with respect to said two intake valves, each of said two intake valves also having a face surface parallel to and directly facing said squish surface portion of said piston, and said exhaust valve having a face surface contributing entirely to said surface bounding said combustion chamber and having a stem whose axis is located in said plane of symmetry for said intake valves, at least one spark plug positioned in said one cylinder asymmetrically with respect to said plane of symmetry for said intake valves, and means for individually regulating amounts of fuel added separately to intake air flowing through said separate intake passages to said one cylinder, to thereby regulate the degree of barrel stratification of fuel distribution in said one cylinder.

24. A method for regulating brake torque output of a stratified-charge, spark-ignition engine throughout a continuous range extending from zero to a maximum brake torque which depends on operating speed of the engine, the engine having (1) first means for individually regulating amounts of fuel added separately to intake air flowing through separate intake passages to a thermodynamic working volume for implementing internal combustion in the four-stroke cycle, reducing fuel added individually to at least one of said intake passages while maintaining fuel added to at least another one of said intake passages producing increased stratification of fuel distribution in said thermodynamic working volume and (2) second means for providing a common intake charge pressure to each of said separate intake passages, the method comprising:

employing said second means to thereby reduce said common intake charge pressure only after employing said first means to increase said stratification to a level which reduces brake torque produced by the engine to less than sixty percent of said maximum brake torque for current operating speed of the engine.

25. The method of claim 24 wherein said second means is employed to reduce said common intake charge pressure only after said first means is employed to increase said stratification to a level which reduces brake torque produced by the engine to less than fifty percent of said maximum brake torque for current operating speed of the engine.

* * * * *